United States Patent
Sung

Patent Number: 6,016,985
Date of Patent: Jan. 25, 2000

[54] MEMORY DEVICE FOR SEAT-BELT LENGTH

[75] Inventor: Myung Ho Sung, Kyungki-do, Rep. of Korea

[73] Assignee: Hyundai Motor Company, Seoul, Rep. of Korea

[21] Appl. No.: 08/998,612

[22] Filed: Dec. 29, 1997

[30] Foreign Application Priority Data

Dec. 30, 1996 [KR] Rep. of Korea ............ 96-76606

[51] Int. Cl.[7] ............ B60R 22/42; B60R 22/48
[52] U.S. Cl. ............ 242/381.1; 280/807
[58] Field of Search ............ 242/381.1, 382, 242/382.4, 385.1, 385.3, 383, 390.8, 390.9; 280/806, 807, 808; 297/475, 476, 477, 478; 200/61.58 B; 180/268

[56] References Cited

U.S. PATENT DOCUMENTS

| | | | |
|---|---|---|---|
| 4,387,862 | 6/1983 | Sakurada et al. | 242/385 |
| 4,489,804 | 12/1984 | Kamijo | 242/390.8 |
| 4,519,652 | 5/1985 | Kamijo | 297/477 |
| 4,666,097 | 5/1987 | Tsuge et al. | 242/390.8 |
| 4,678,134 | 7/1987 | Ameur | 242/383 |
| 5,553,804 | 9/1996 | Hamann | 242/382.4 |

*Primary Examiner*—John M. Jillions
*Attorney, Agent, or Firm*—Christie, Parker & Hale, LLP

[57] ABSTRACT

A memory device for seat belt length in automobiles is fabricated in such a manner that bar codes having some location information are attached to the seat belt so that a bar code reader can detect said information and remember the preferred length of the seat belt for a particular user. Thus, when the user fastens the seat belt, the device automatically adjusts the seat belt length onto him with a comfortable length. By remembering the preferred length of a particular user, such remembered length allows him to quickly and easily fasten his seat belt at a more convenient length.

10 Claims, 4 Drawing Sheets

MEMORY DEVICE FOR SEAT-BELT LENGTH

FIELD OF THE INVENTION

This invention relates to a memory device for seat-belt length in automobiles, and more particularly, to a memory device for seat-belt length in automobiles being fabricated in such a manner that by utilizing a means to detect the body shape of a driver, an appropriate seat-belt length is remembered.

BACKGROUND OF THE INVENTION

In general, a seat belt is a primary safety device to protect a driver and passenger(s) from any abrupt traffic accident. In light of such importance, the fastening of seat belts is now mandatory under the many current traffic laws. To this end, a device to prevent the start of an engine without fastening of a seat belt has been under development.

As illustrated in FIG. 1, a seat belt assembly is shown where a seat belt retractor 10 is installed within the lower side of a center pillar of a car body, and the seat belt 11, coupled with the seat belt retractor 10, is inserted into the upper part of an anchor plate. When the tongue of the seat belt is inserted into the buckle of the seat belt, a person is fastened into the seat belt.

The seat belt 11 can be fastened with a slow pulling, but sudden rapid pulling cannot release the seat belt, due to the emergency locking retractor.

Further, after fastening the seat belt, the belt begins to retract slightly within the retractor, and adjust tightly to the human body. Thus, the belt presses across the user's upper body, and he feels some discomfort on the fastening of the seat belt.

SUMMARY OF THE INVENTION

The present invention is intended to overcome the above mentioned disadvantages associated with prior art seat belt assemblies.

It is therefore an object of this invention to provide a memory device for seat-belt length in automobiles fabricated in such a manner that when a driver adjusts the seat belt length appropriate for his body type, its belt length is remembered. Then, the belt is held in place corresponding to the memorized length when the belt is fastened. The device of this invention can deal with oppressive and inconvenient feeling when a person fastens the seat belt.

In one embodiment, the invention includes a seat belt and means for remembering a preferred length of the seat belt and automatically adjusting the length of the seat belt accordingly when a user fastens the seat belt. The remembering means includes a plurality of bar codes on the seat belt, each of the plurality of bar codes containing location information defining a length of the seat belt, and a bar code reader for reading the location information contained on the plurality of bar codes. Additionally, an electronic controller is operatively coupled to the bar code reader for storing location information associated with a preferred length of the seat belt, and the length of the seat belt is controlled based on a signal from the electronic controller such that the seat belt is automatically adjusted to the preferred length when fastened by the user. In one embodiment, a brake mechanism is used to control the length of the seat belt.

DETAILED DESCRIPTION OF THE INVENTION

Figure 1:
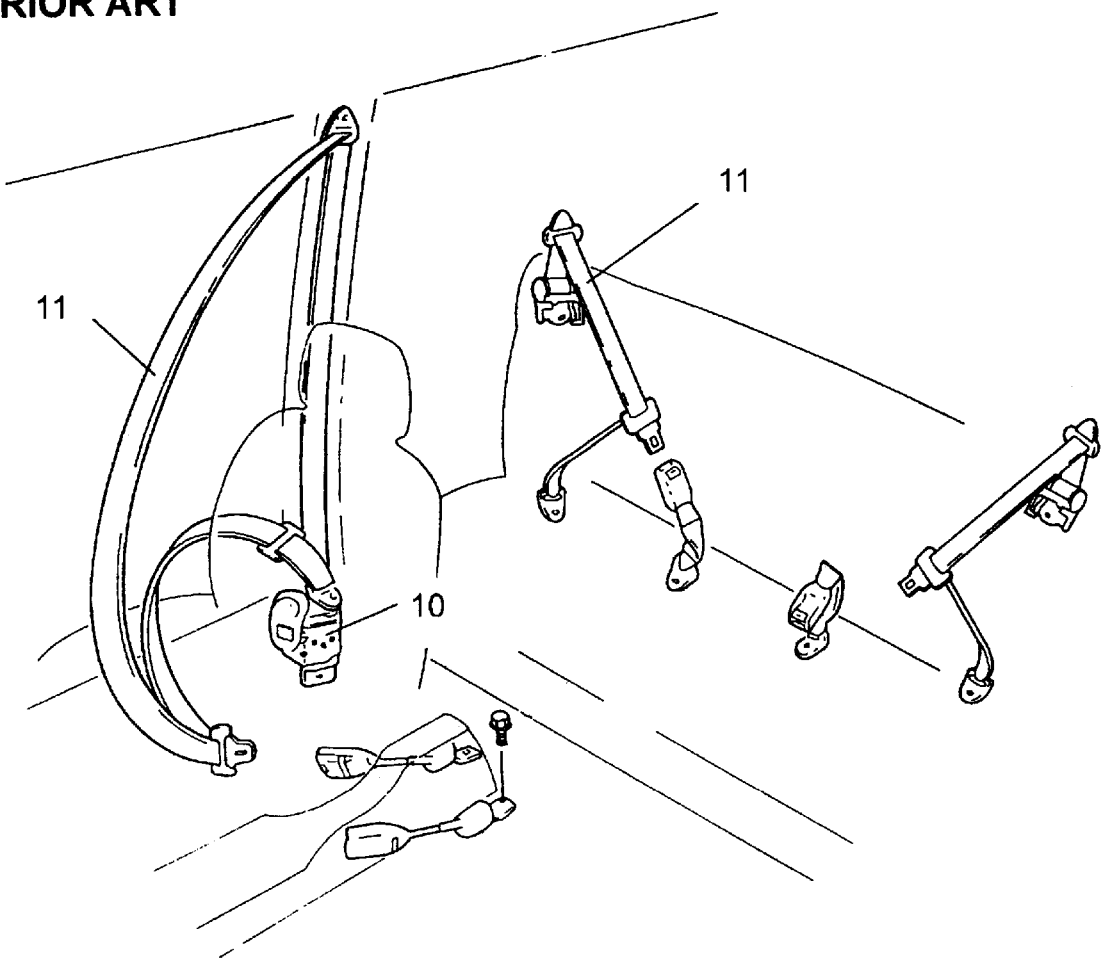
FIG. 1 is a schematic view showing a prior art seat belt assembly.
Figure 2:
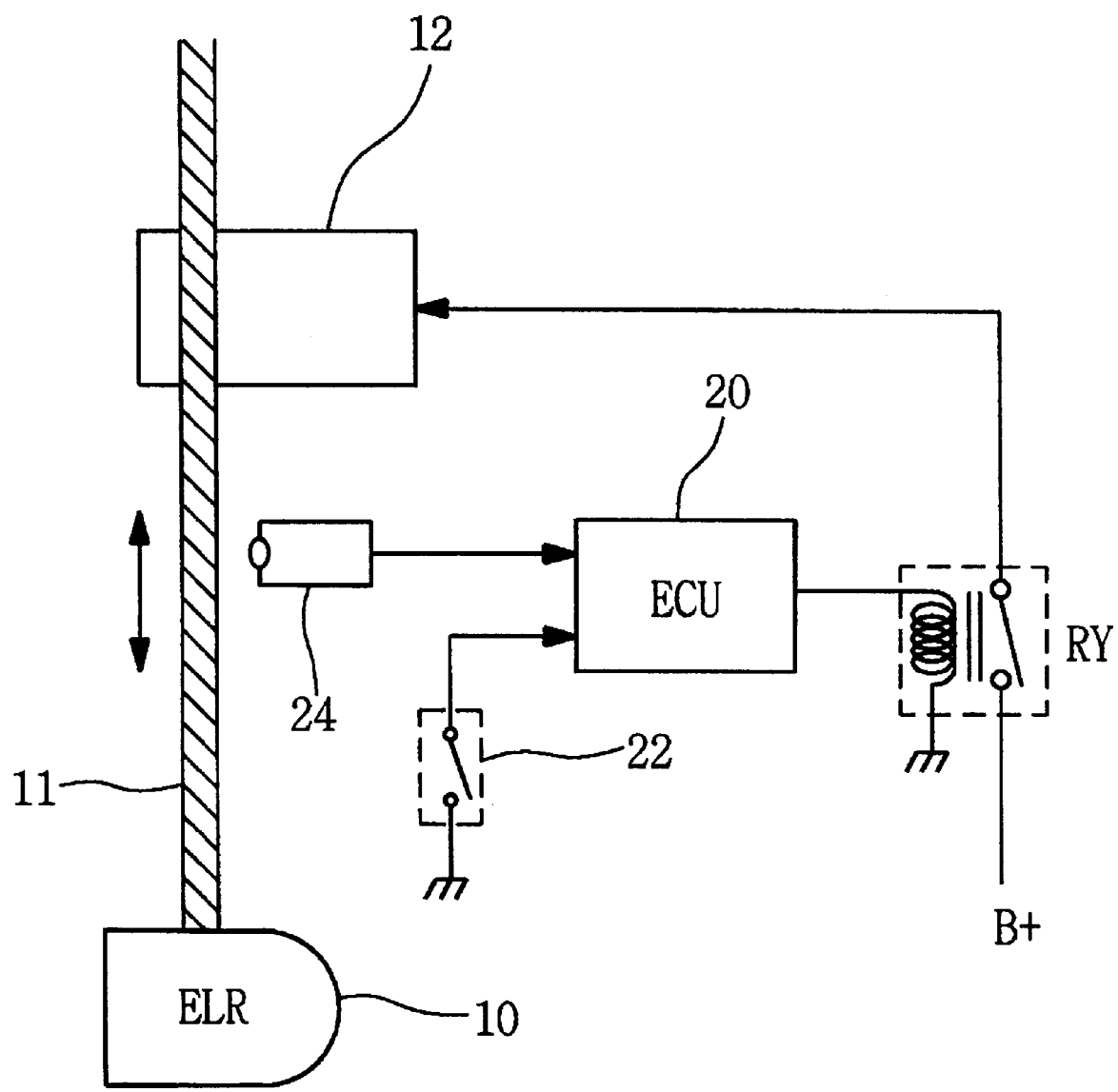
FIG. 2 is a schematic view of the memory device for seat belt length according to the present invention.

To achieve the aforementioned objective, the device of this invention includes a plurality of bar codes 30 attached along one side of the seat belt. Each bar code contains intrinsic location information that is related to the length of the seat belt at that location. Preferably, the bar codes are attached along a length of the seat belt, centrally located along a width of the seat belt, and are spaced at relatively even intervals of about 5–10 millimeters.

A bar code reader is provided adjacent the seat belt to read the information stored on the bar codes 30. An electronic controller 20 is operatively connected to both an output of the bar code reader 24 and an output side of an adjustable switch 22. When the adjustable switch 22 is in the "on" state, the length of the seat belt is stored in the electronic controller by reading the bar code 30 at the corresponding position of the seat belt with the bar code reader 24. A fixture 12 is operatively coupled to the output side of the controller 20 through a battery power source B', positioned above the bar code reader 24, and operates to hold the seat belt in place based on a signal from the electronic controller.

According to a presently preferred embodiment of this device, a motor 25 within the fixture 12 rotates based on a motor driving signal of the controller 20. The seat belt 11 passes through the fixture 12, and the rotation of the motor 25 operates a braking mechanism wherein member 17 is forced to press the seat belt 11 against a friction pad 15 located on one side of the fixture 12, thus holding the seat belt in place.

When a user fastens the seat belt 11, the adjustable switch 22 sends a signal to the electronic controller 20 to initiate operation of the invention. The electronic controller 20 stores information indicative of the length of the seat belt to remember the comfortable length of the seat belt for that user, based on the information provided from the bar code reader.

Figure 3:
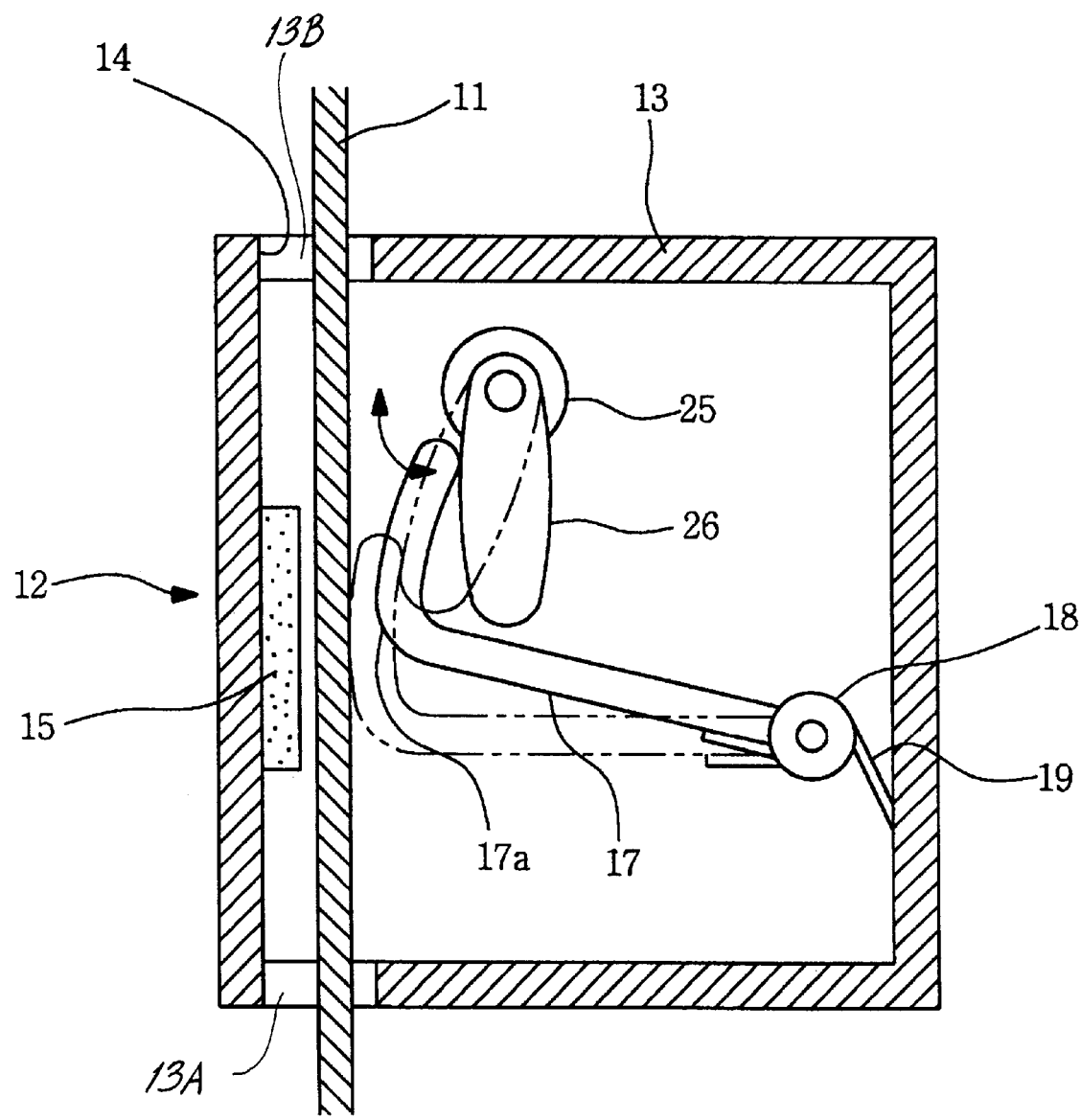
FIG. 3 is a cross-sectional view of the fixture of FIG. 2.

Referring now to FIG. 3, a presently preferred embodiment of the fixture 12 is illustrated in detail. The fixture includes a housing 13 having openings 13A, 13B at opposite ends to permit the seat belt 11 to pass through the housing. An electric motor 25 coupled to a revolving cam 26 is located within the housing, on one side of the seat belt, and is operatively coupled to the electronic controller. A chair-type revolving fragment 17 is hingedly provided within the housing 13. The elastic force of a spring 19 biases the fragment 17 upward around a hinge axis 18. As a result, a fixing plate 17A, which is extends upward from the fragment 17, is biased into contact with the cam 26.

When the driving signal of the controller 20 is supplied to the fixture 12, the power source B' is provided to the motor 25 to revolve the cam 26 clockwise, as seen in FIG. 3. As a result, the fixing plate 17A is pressed into contact with one side of the seat belt 11, thus holding the seat belt in place. Specifically, the fixing plate 17A presses the seat belt 11 into contact with the friction plate 15, located on the opposite side of the seat belt.

When the seat belt 11 is slowly pulling at the upper direction of the retractor 15, the fixing plate is revolved toward the cam, and the seat belt 11, which is held in place, is separated.

Figure 4:
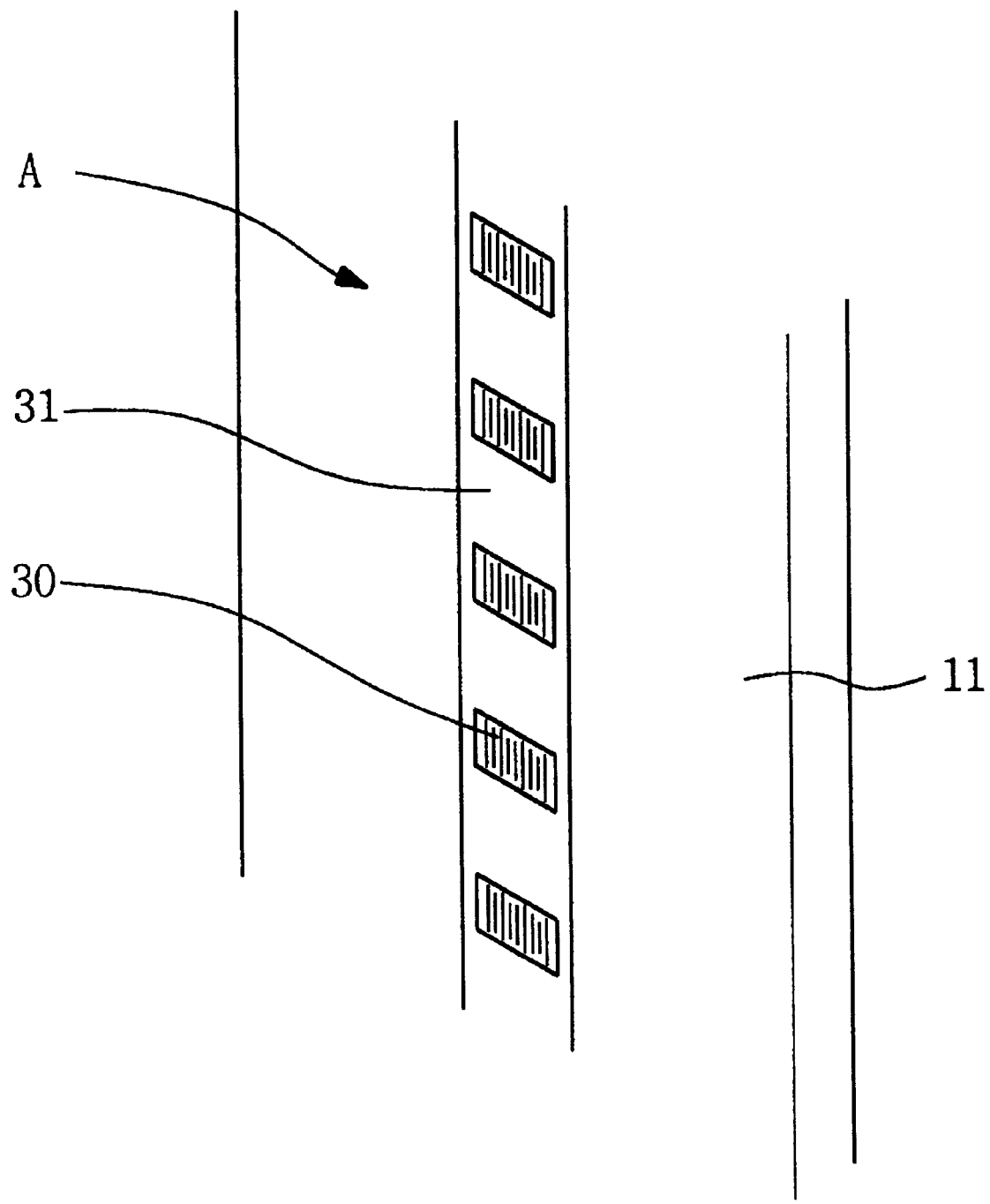
FIG. 4 is a perspective view of the lower section of a seat belt according to the present invention having a plurality of bar codes attached to the seat belt.

Referring now to FIG. 4, the lower section of the seat belt is illustrated in detail. The lower part of the seat belt includes the plurality of bar codes 30 attached to the seat belt along to the bar code line 31, preferably at the intervals of 5–10 millimeters. Each bar code 30 contains the location information as described above.

With such structure, it is preferred that the fixing plate 17A includes a groove at its center so as to contact the seat belt on opposite sides of the bar code line 31, thus preventing damage of the bar code 30.

Further, the housing 13 of the fixture 12 may be installed in parallel within the conventional seat belt guide attached to the inside panel of the center pillar, according to the design of this invention. As such, when the adjustable switch 22 is pressed, followed with the storage of fixed location of the seat belt via the bar code 30, the seat belt is again fastened. The seat belt 11 drawn thereto is automatically held in place at the appropriate memorized length of the seat belt 11 by fixture 12.

As mentioned in the above, this invention has an advantage in that by controlling the seat belt length suitable to the body of a driver, such remembered length allows him to fasten his seat belt at more convenient length, this enhancing the convenience and pleasantness on the part of a driver.

What is claimed is:

1. A memory device for seat belt length, comprising:
   a plurality of bar codes attached along a length of a seat belt, each of the plurality of bar codes containing location information corresponding to seat belt length;
   a bar code reader designed to read the location information contained in the plurality of bar codes;
   an adjustable switch for initiating operation of the device to remember a particular seat belt length;
   an electronic controller 20 operatively coupled to both an output side of the adjustable switch and an output side of the bar code reader, wherein the location information read by the bar code reader is stored in the electronic controller when the adjustable switch is activated and
   a fixture operatively coupled to the output side of the electronic controller, for automatically providing a seat belt of a remembered length based on a signal from the electronic controller indicative of the location information stored in the electronic controller.

2. The device for a seat belt length according to claim 1, wherein the fixture comprises:
   a housing through which the seat belt extends;
   a friction plate positioned within the housing on one side of the seat belt; and
   a revolving member positioned on the other side of the seat belt,
   wherein, based on the signal from the electronic controller, the revolving member presses the seat belt against the friction plate to restrain further motion of the seat belt once the remembered length is reached.

3. The memory device for seat-belt length according to claim 1, wherein each of said plurality of bar codes is attached to the seat belt along a length of the seat belt on a bar code line, at intervals of about five to about ten millimeters.

4. The memory device for seat-belt length according to claim 2 wherein the fixture further comprises an electric motor operatively coupled to the electronic controller, and a cam rotably driven by the electric motor, wherein rotation of the cam by the motor forces the revolving member toward the seat belt.

5. The memory device for seat-belt length according to claim 4 wherein the revolving member comprises a revolving fragment hingedly provided within the housing, and a fixing plate extending upwardly from the revolving fragment, wherein the fixing plate is biased upward into contact with the cam, and wherein the fixing plate is brought into contact with the seat-belt by rotation of the cam.

6. The memory device for seat-belt length according to claim 5 wherein the fixing plate is designed to contact the seat-belt on opposite sides of the bar code line so as not to damage the plurality of bar codes.

7. A seat belt assembly comprising:
   a seat belt;
   means for remembering a preferred length of the seat belt and automatically adjusting the length of the seat belt accordingly when user fastens the seat belts; and
   wherein the remembering means comprises:
      a plurality of bar codes on the seat belt, each of the plurality of bar codes containing location information defining a length of the seat belt; and
      a bar code reader for reading the location information contained on the plurality of bar codes.

8. The seat belt assembly according to claim 7 wherein the remembering means further comprises:
   an electronic controller operatively coupled to the bar code reader for storing location information associated with a preferred length of the seat belt; and
   means, operatively coupled to the electronic controller, for controlling the length of the seat belt based on a signal from the electronic controller such that the seat belt is automatically adjusted to the preferred length when fastened by the user.

9. The seat belt assembly according to claim 8 wherein said means for controlling the length of the seat belt comprises a housing through which the seat belt extends, and a brake mechanism within the housing.

10. The seat belt assembly according to claim 9 wherein said brake mechanism comprises a pair of plates within the housing on opposite sides of the seat belt, wherein the plates are movable relative to one another so as to restrain further movement of the seat belt once the preferred length is reached.

* * * * *